Patented May 8, 1951

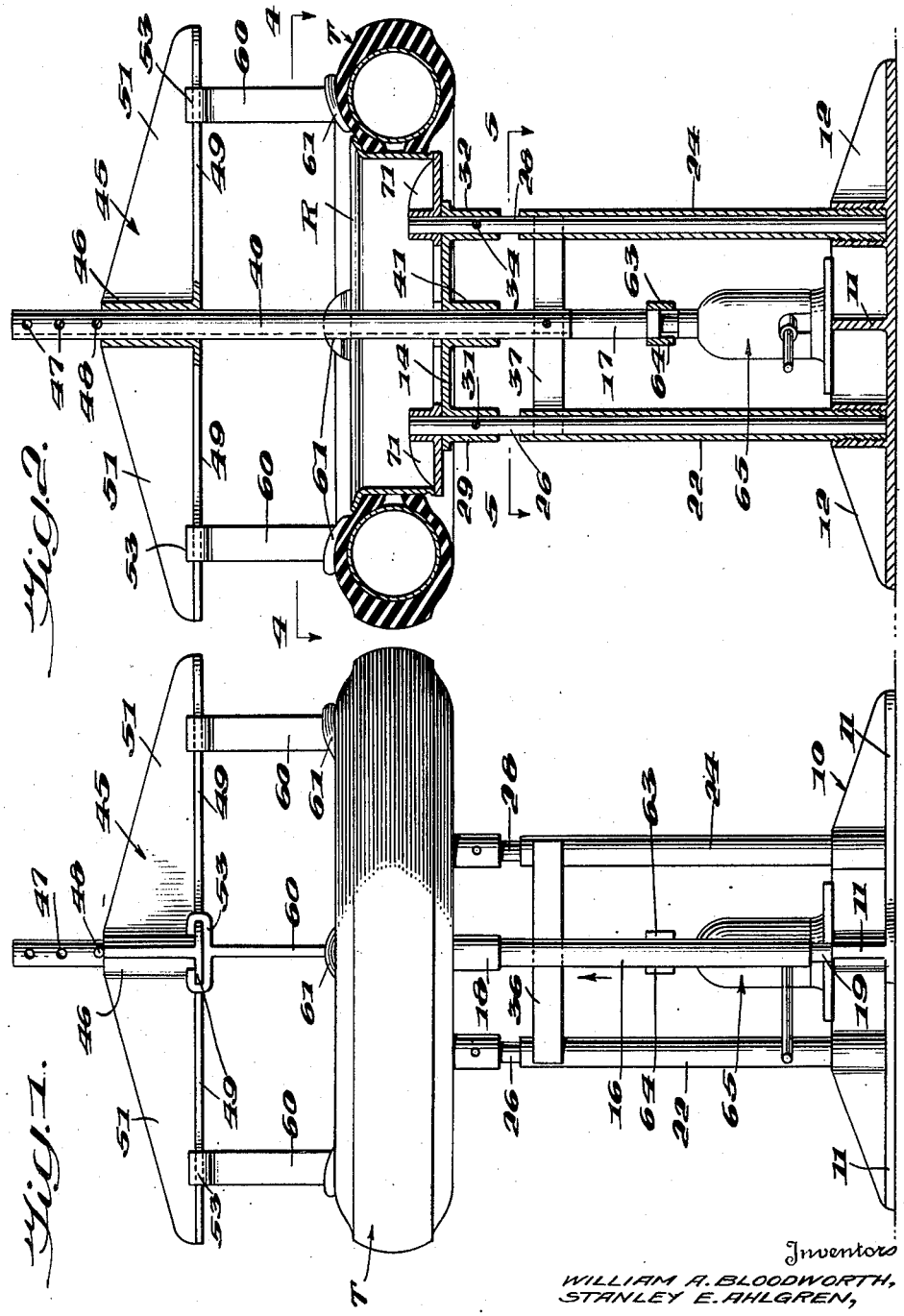

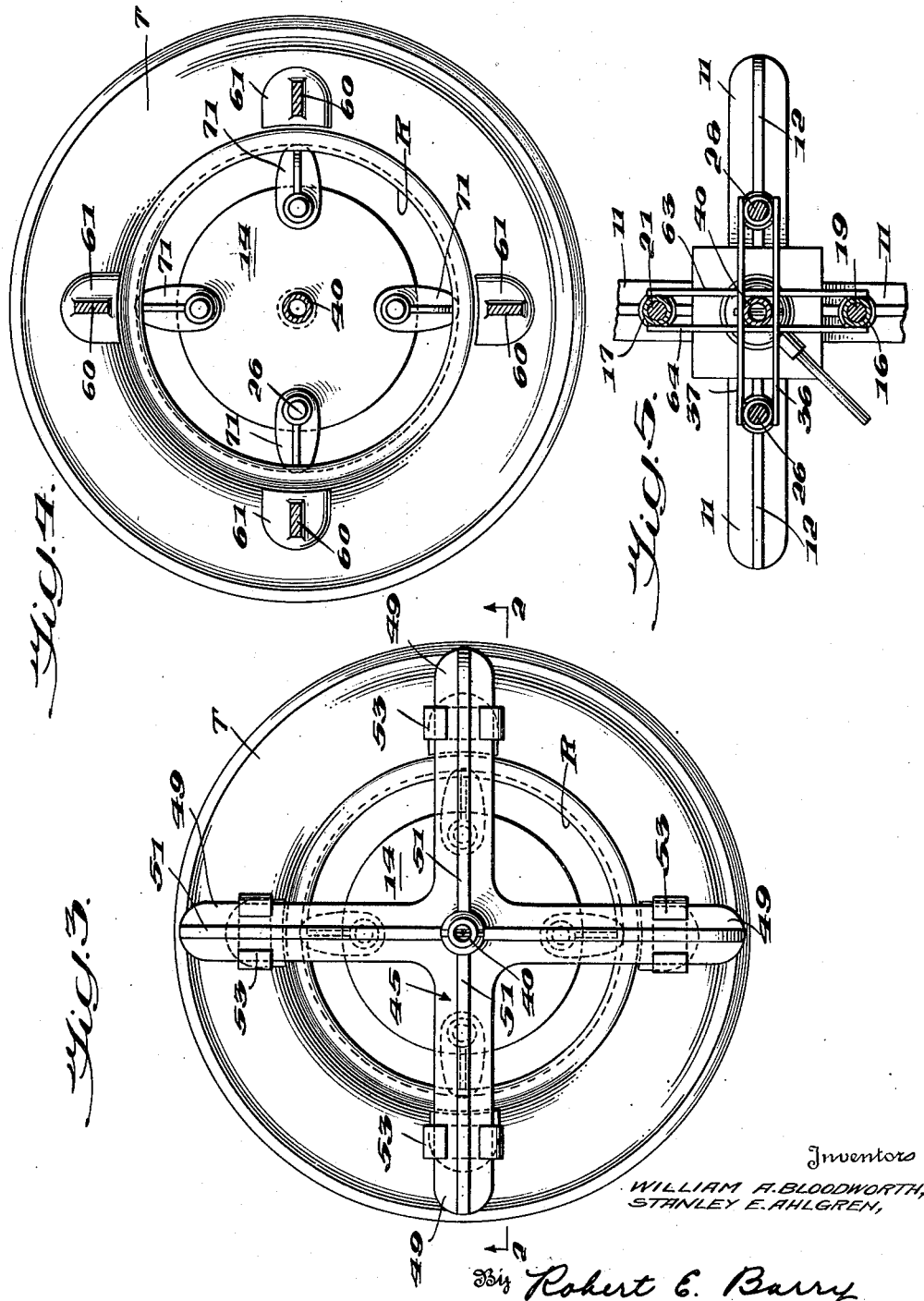

2,551,994

UNITED STATES PATENT OFFICE 2,551,994

TIRE REMOVING DEVICE WITH CIRCUM-
FERENTIALLY DISTRIBUTED THRUST
MEMBERS

William A. Bloodworth and Stanley E. Ahlgren,
San Antonio, Tex.

Application June 14, 1948, Serial No. 32,828

2 Claims. (Cl. 157—1.2)

The present invention relates to apparatus for removing a pneumatic tire casing from a demountable rim or wheel and the invention more specifically pertains to a mechanism wherein the rim or wheel may be pushed from association with a tire casing.

The prior art includes devices or mechanisms for removing tire casings from wheels or rims, and it is one of the objects of the invention to provide a support for the rim having a tire casing thereon which may be adjusted to accommodate rims of various sizes and mounted on telescoping legs including means for holding the tire in a fixed position so that when the rim supporting member is moved upwardly, the tire casing will be removed from the rim.

A more detailed object of the invention resides in providing two pairs of telescoping legs in association with a supporting member which legs may be extended by any suitable means such as a hydraulic jack applying force to one pair of the telescopic legs including means for engaging the tire casing connected to the other pair of telescopic legs so that when these leg assemblies are extended the rim or wheel may be removed from the tire casing.

Another object of the invention is to provide a novel spider member for carrying a plurality of tire engaging elements which may be readily adjusted on the spider member to render the apparatus suitable for removing tire casings of various sizes and another object of the present invention is to simplify the apparatus and to provide a tire removing mechanism which is reliable in operation, and which includes a minimum number of parts.

Other objects and features of the invention will be more apparent as the present disclosure proceeds and upon consideration of the accompanying drawings and the following detailed description wherein an exemplary embodiment of the invention is disclosed.

In the drawings:

Fig. 1 is a side elevational view of a tire casing removing device exhibiting the invention.

Fig. 2 is a sectional view, taken approximately on the line 2—2 of Fig. 3.

Fig. 3 is a plan view of the apparatus shown in Fig. 1.

Fig. 4 is a horizontal sectional view, taken on the line 4—4 of Fig. 2.

Fig. 5 is a transverse sectional view taken on the line 5—5 of Fig. 2.

The present invention is directed to a mechanism for facilitating the removal of a tire casing from a rim or wheel and includes a group of telescopic legs for supporting the wheel or rim with the tire thereon. These legs may be extended to apply force to the wheel or rim while the casing is held in a substantially fixed position so as to push the wheel or rim from association with the tire casing. These telescopic legs serve to guide the wheel or rim supporting table during movement of the table. One group of the telescopic legs includes a linkage arrangement connected to a spider member arranged above the tire casing which is thereby restrained from upward movement. The invention includes a novel construction of the spider member so that the tire casing engaging elements carried thereby may be readily adjusted to adapt the apparatus to tire casings of various sizes. Another feature of the invention pertains to the structure of the base member in association with the telescopic legs whereby force may be conveniently applied in a reliable manner to urge the wheel or rim from the tire casing.

Referring to the drawings, there is shown at 10, a base member which may be of any suitable outline in plan, but in the embodiment illustrated, includes four radially arranged arms 11. These arms may be reinforced by vertical webs or gusset members 12. The base member 10 is provided with a substantially flat under surface to thereby support the apparatus on any suitable floor or like surface.

The tire removing apparatus includes a table 14 which may be disk-shaped as shown particularly in Fig. 4. This table is provided for the purpose of supporting a wheel or rim R having a tire casing T thereon which is to be removed. A plurality of telescopic legs are arranged under the table 14 and one pair of these legs includes two tubes 16 and 17 attached to the table 14 in any suitable manner so as to depend therefrom. Each tube 16 and 17 may be secured to the under side of the table by means of a sleeve 18 or the like. The sleeve 18 may be welded to the table 14 and the tubes 16 and 17 may be likewise joined to the respective sleeves. The telescopic leg structures which include the tubes 16 and 17 are completed by means of two rods 19 and 21 which are secured to diametrically opposite arms 11 of the base member. These rods 19 and 21 may be threaded into suitable openings in the base member or welded thereto. The tube 16 is adapted to receive the rod 19 for guided movement on the rod 19 and the tube 17 is adapted to receive the rod 21 for sliding movement thereon. Accordingly, the tubes 16 and 17 may be moved axially on the rods 19 and 21 and this structural arrangement provides for guided movement of the table 14 on the rods 19 and 21.

The other telescopic legs include two additional tubular members 22 and 24. These tubular members may be threaded in suitable openings provided in the other pair of radial arms 11 of the base member 10, or these tubular members may be welded to the base member. A pair of shafts 26 and 28 are secured to the table 14 and depend therefrom respectively into the tubular members 22 and 24, as shown particularly in Fig. 2. The shaft 26 may be mounted in a sleeve 29 formed integrally with the table 14 in any suitable manner such as by welding or by means of a pin 31. A similar structural arrangement is provided for securely attaching the shaft 28 to the table 14. This structure may include a sleeve 32 formed integral with the table 14. The shaft 28 may be welded to the sleeve 32 or connected thereto by means of a pin 34. The shafts 26 and 28 fit snugly within the tubular members 22 and 24 but are free for axial movement therein so that these shafts may be moved upwardly and are guided during this movement by the tubular members 22 and 24.

A transverse member is connected to the upper ends of the tubular members 22 and 24 and this transverse structure may be formed by two bars 36 and 37 welded to the tubular members 22 and 24. A tube or rod 40 is connected to the bars 36 and 37 in axial alignment with the axis of the table 14, and extends upwardly through an opening in the table. This tube 40 is of sufficient length to extend a material distance above the table 14 and the purpose thereof will be more apparent as the present disclosure proceeds. The table 14 may be provided with a bearing sleeve 41 for guiding the table 14 in movement axially of the tube or rod 40.

The invention includes a spider member 45 which is adapted to be mounted on the upper end of the tube 40 and for this purpose, the spider member is provided with a hollow hub portion 46 at the axis thereof through which the tube 40 extends. The tube or hollow cylindrical member 40 is provided with a plurality of transverse openings 47 through which a pin 48 may be inserted to prevent upward sliding movement of the spider member 45 on the tube or rod 40. The holes 47 provide for adjustment of the position of the spider relative to the length of the rod 40. The spider 45 includes a plurality of radial arms which, in the embodiment illustrated, are circumferentially spaced at ninety degree intervals. Each of the radial arms includes a horizontal web 49 and a vertical reinforcing web 51. The horizontal webs 49 of each arm thus present in combination with the reinforcing vertical web 51, an inverted T-shaped structure as viewed in cross-section and as will be apparent from a consideration of Fig. 1.

A plurality of tire casing engaging elements 60 are carried by the spider member 45 and each of these tire casing engaging elements includes a C-shaped portion 53, which is adapted to substantially embrace the horizontal web 49 of a radial arm of the spider member. This C-shaped arrangement permits the tire engaging element to be moved radially on the arm whereby these tire engaging elements 60 may be shifted to adjust the positions thereof and for engaging tires of different diameters. Each tire engaging element 60 terminates at its lower end in a plate-shaped portion 61 which is so formed as to provide an abutment over a portion of the arcuate side wall of a tire casing as shown in Fig. 2.

Another transverse member is provided connecting the tubes 16 and 17 and this transverse structure may include two bars 63 and 64 which may be welded to opposite sides of the tubes 16 and 17 as shown in Fig. 5. This transverse assembly as provided by the bars 63 and 64 is for the purpose of receiving the thrust of any suitable mechanism such as a hydraulic jack of a conventional design and shown generally at 65 in the drawings. The hydraulic jack may bear at its lower end on the base member 10 and is adapted to apply force to the transverse member as provided by the bars 63 and 64 to move the tubes 16 and 17 upwardly. Such upward movement of the tubes will move the table 14 upwardly and the reaction provided on the base 10 will hold the tubular members 22 and 24 in a fixed position whereby the shafts 26 and 28 may be moved from these tubular members and guide the table during its upward movement. At the same time, the tube 40 remains in a fixed position since it is secured to the tubular members 22 and 24 by means of the transverse member as represented by the bars 36 and 37.

A tire to be demounted includes a tire casing T mounted on a wheel or rim. The rim R as shown in the drawings is of the type having a conventional type lock rim (not shown) for retaining the tire casing on the rim. In utilizing the apparatus, the lock rim is first removed from its fixed position and the rim R with the tire casing thereon, is then arranged on the table 14 with the rim arranged in the position as shown in Fig. 2. The hydraulic jack 65 is actuated to arrange the table 14 in its lowermost position. Thereafter, the spider member 45 is arranged on the tube 40 and the pin 48 is inserted in proper hole 47. The tire engaging elements 60 are then adjusted on the radial arms of the spider member so as to engage the tire casing approximately in the positions in Fig. 2. The table 14 may be provided with lugs 71 which may be rotated to adjust the diameter of the outer ends of these lugs. The lugs are so adjusted as to engage the rim R without projecting outwardly beyond the perimeter of the rim.

With the parts in such positions, operation of the hydraulic jack 65 will move the tubes 16 and 17 upwardly on the rods 19 and 21. The table 14 and the lugs 71 are thereby moved upwardly to push the rim R upward. The tire casing T is retained in a substantially fixed position since the tubular members 22 and 24 are rigidly connected to the base 10 and since the tube 40 is connected to these tubular members. Accordingly, the spider 45 remains in a fixed position and further upward movement of the table provides for pushing of the rim R out of the tire casing while it is held by the members 60.

In the event that a tire casing is to be removed from a wheel devoid of a demountable rim, the wheel may be arranged on the table 14 and the tube 40 will then extend through the opening provided at the axis of the wheel. In this case, the lugs 71 need not be employed for engaging the rim of the wheel.

While the invention has been described with reference to specific structural features and with regard to a particular general organization, it will be appreciated that changes may be made in the various elements along with modifications in the assembly. Such modifications and others may be made without departing from the spirit and scope of the invention, as set forth in the appended claims.

What we claim and desire to secure by Letters Patent is:

1. In tire removing apparatus, a base member, two rods connected to and extending upwardly from the base member, a table, two tubes carried by the table with the tubes respectively embracing said rods, two tubular members secured to the base member, two shafts carried by the table respectively depending into said tubular members, a spider member above the table, a transverse member connecting said tubular members, a tube secured to and extending upwardly from said transverse member through said table, means for adjustably securing the spider member to said tube, tire engaging elements carried by the spider member, a transverse member connecting the tubes, and a hydraulic jack resting on the base member and engageable with the last transverse member to move the table upwardly.

2. In tire removing apparatus, a base member including radially arranged arms, two rods connected respectively to diametrically opposite arms of the base member and extending upwardly therefrom, a table, two tubes carried by the table with said tubes respectively embracing said rods, two tubular members secured to other diametrically arranged arms of the base member, two shafts carried by the table respectively depending into said tubular members, a spider member above the table, a transverse member connecting said tubular members, means secured to and extending upwardly from said transverse member, means for securing the spider member to said means, tiring engaging elements carried by the spider member, a transverse member connecting said tubes, and expansible means engaging the base member and engaging the last-mentioned transverse member to move the table upwardly.

WILLIAM A. BLOODWORTH.
STANLEY E. AHLGREN.

REFERENCES CITED

The following references are of record in the file of this patent:

UNITED STATES PATENTS

| Number | Name | Date |
|---|---|---|
| 1,724,813 | Weaver et al. | Aug. 13, 1929 |
| 1,729,861 | Anderson | Oct. 1, 1929 |
| 2,228,086 | Rodgers | Jan. 7, 1941 |
| 2,345,346 | Larson | Mar. 28, 1944 |
| 2,375,956 | Smith et al. | May 15, 1945 |
| 2,416,195 | Mitchell | Feb. 18, 1947 |
| 2,436,003 | Gosselin | Feb. 17, 1948 |

FOREIGN PATENTS

| Number | Country | Date |
|---|---|---|
| 575,558 | Great Britain | Feb. 22, 1946 |